April 29, 1969

A. ROBERTS 3,441,641

METHOD OF MAKING BELTS

Filed Jan. 3, 1966

United States Patent Office 3,441,641
Patented Apr. 29, 1969

3,441,641
METHOD OF MAKING BELTS
Albert Roberts, Edinburgh, Scotland, assignor to The North British Rubber Company Limited, Edinburgh, Scotland, a corporation of Scotland
Filed Jan. 3, 1966, Ser. No. 518,110
Int. Cl. B29d 29/02
U.S. Cl. 264—229                    2 Claims

ABSTRACT OF THE DISCLOSURE

A method for making a positive drive belt having tension cables wherein a stock material, such as rubber, is treated and forced through transfer ports by way of a plunger into a belt mold. The transfer ports are arranged so as not to disturb the position of the tension cables in the mold during entry of the stock material.

---

This invention relates to positive drive belts and methods of molding same of the type having driving teeth on one side adapted to mesh with a toothed pulley or gear wheel and means on the opposite side adapted to have conveyor or elevator apparatus associated therewith, with longitudinally extending tension members extending throughout the length of said belt. Thus, when used as either a conveyor or elevator, the belt provides the driving mechanism and longitudinal strength of the system.

The object of the present invention is to provide a positive drive belt having a high degree of flexibility and resistance to strain.

The invention consists in a positive drive belt of the type referred to, wherein a shear resistant material is molded over the driving teeth of the belt.

The invention further consists in a method of forming a positive drive belt of the type referred to comprising the steps of, placing a fabric material onto a mold forming the driving teeth, positioning and tensioning a plurality of longitudinally extending members above the fabric material, closing a mold forming the back of the belt over said tensioned members and forcing a plastic material into the cavity between the molds to form said belt with the fabric material positioned on the outer surface of said driving teeth.

Figure 1:
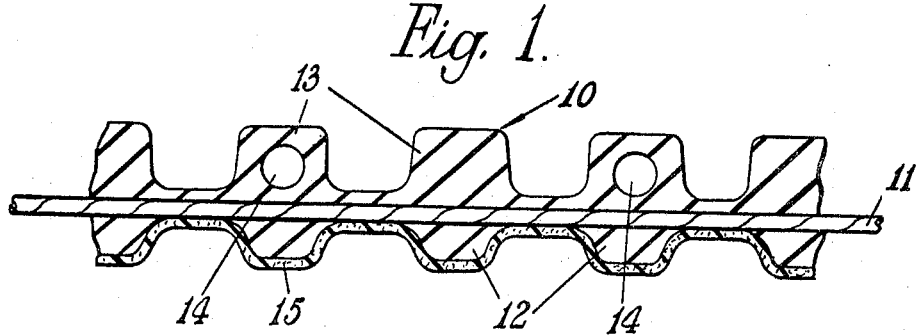
Figure 2:
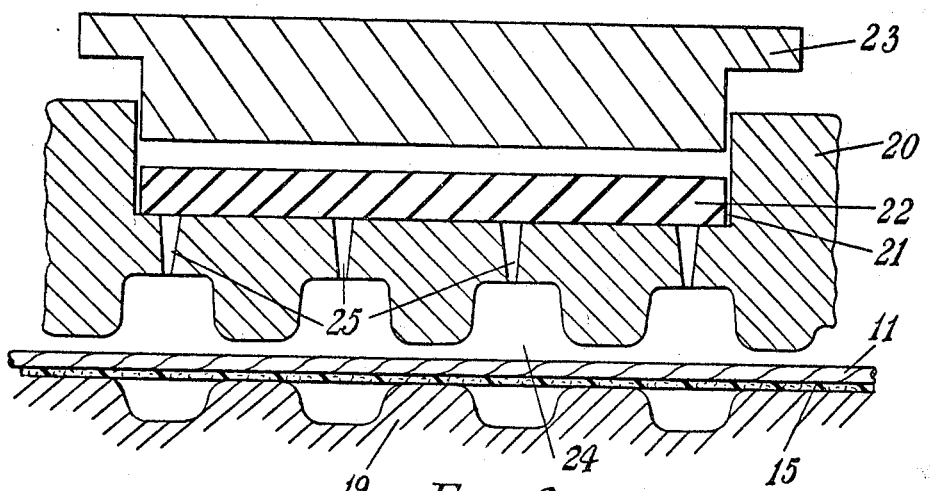
Figure 3:
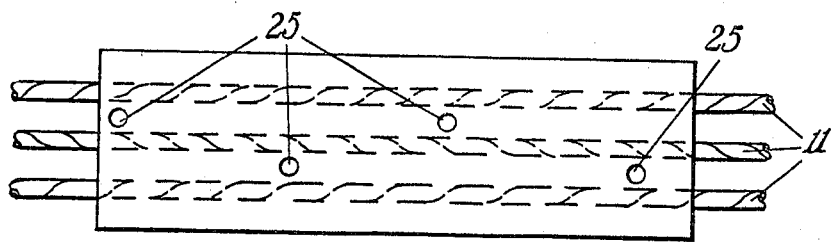

In the accompanying drawings:
FIG. 1 is a longitudinal section through a positive drive belt according to the present invention,
FIG. 2 is a sectional view of the apparatus used for forming the belt shown in FIG. 1, and
FIG. 3 is a diagrammatic plan view of the transfer pot of the apparatus shown in FIG. 2.

In carrying the invention into effect according to one convenient mode, by way of example, the belt 10 shown in FIG. 1 is composed of rubber or a plastic material having spaced, longitudinally extending tension members 11 forming strain-resistant members. Each tension member 11 is normally a low stretch wire although a synthetic cord such as fibre glass or heat set nylon may also be used.

The belt 10 is provided with driving teeth 12 on one side and teeth or blocks 13 on the other side thereof. The blocks 13 provide the means by which the elevator or conveyor (not shown) is attached to the belt 10 and are preferably positioned in alignment with the driving teeth 12, but, if desired, they can be staggered so that each block 13 occupies a position opposite the space between adjacent driving teeth 12.

An aperture 14 of suitable size and shape is formed on the longitudinal axis of certain of, or each block 13 and the end of a rod (not shown) is accommodated in each aperture 14. The belt 10 can be used singly on a monorail type system or a pair of belts 10 may be mounted in spaced, parallel relationship with a series of rods extending between the belts 10 with the ends of the rods accommodated, respectively, in the apertures 14 of aligned blocks 13.

The belt described above is molded by a process and apparatus as shown in FIGS. 2 and 3 which ensures that the tension members 11 remain straight and parallel with respect to each other and with the edge of the belt 10, and also remain in a constant horizontal plane along the neutral axis of the belt 10. In the molding process a protective fabric jacket 15 is molded over the drive side of the belt 10 which serves to bring about a major improvement in the shear strength and abrasion resistance of the driving teeth.

The belt 10 is made to any given length by a series of step cures in a mold in a flat press, by transfer molding as will now be described. A strip of rubber (or plastic) coated fabric 15 which forms the protective jacket is laid in the bottom section 19 of the mold, i.e. against the part of the mold forming the drive side of the belt 10. The fabric 15 is of such a construction that it has a high stretch in the longitudinal direction of the belt 10 and low stretch in the transverse direction. The tension member cables 11 are then laid over the fabric 15 and a predetermined tension applied thereto. The centre section 20 of the mold which forms the side of the belt with the blocks 13 thereon and also incorporates the tranfer pot 21, is then closed over the cables 11 and fabric 15. Any adjustments necessary to the cable tension are then made.

A blank of rubber 22 (or plastics material) with a low plasticity is then placed in the transfer pot 21 and the mold plunger 23 is moved downwardly which forces the rubber 22 into the mold cavity 24 through transfer passages 25 which are so positioned that the rubber 22 enters the portions of the mold cavity 24 which form the blocks 13 on the back of the belt 10 at points directly above the spaces between two adjacent cables 11 as shown in FIG. 3. Such a location ensures the rubber 22 enters the mold with the minimum displacing effect on the tension member cables 11 and also acts directly onto the tooth jacket fabric 15 and thus displaces the latter against the full length of the drive tooth cavities so that it forms a smooth outline of the tooth form 12. The mold cavity 24 gradually fills and the complete section of belt is thus formed. An additional precaution to reduce movement of the tension cables 11 and ensure a balanced flow of material into the mold is that the transfer passages 25 are staggered in a longitudinal direction along the length of the mold. This arrangement also ensures that the rubber entering the mold carries the tooth fabric uniformly in front of it so reducing the likelihood of the fabric creasing, or the rubber flowing round the edge of the fabric into contact with the lower mold surface.

It will be appreciated that while a belt having blocks 13 has been specifically described, it is also possible to merely increase the thickness of the back of the belt and then drill apertures therein for attachment of the conveyor or elevator rods.

Having thus described my invention, what I claim and desire to protect by Letters Patent is:

1. A method for making a positive drive belt comprising the steps of: positioning a plurality of spaced tension cables on the surface of a belt mold, said mold having tooth forming grooves therein extending substantially perpendicular to said cables; and forcing rubber into said grooves through transfer passages in an upper mold portion; said transfer passages being located in the spaces between said cables and being staggered in a longitudinal direction along the length of said mold; whereby, the force of said rubber entering said grooves is directed away from said cables to result in a minimum displacement of said cables during the molding operation.

2. The method of claim 1 further comprising the steps of positioning a stretchable fabric against said mold before positioning said cables so that the force of said rubber pushes said fabric into said grooves whereby a shear resistant covering is provided for said teeth.

References Cited
UNITED STATES PATENTS

| | | | |
|---|---|---|---|
| 2,422,266 | 6/1947 | Steinke | 264—229 X |
| 2,777,411 | 1/1957 | Geisler | 264—328 X |
| 3,078,205 | 2/1963 | Sauer et al. | 264—229 X |
| 3,114,598 | 12/1963 | Beckadolph et al. | 294—277 X |

ROBERT F. WHITE, *Primary Examiner.*

K. J. HOVET, *Assistant Examiner.*

U.S. Cl. X.R.

18—30, 36; 264—257